Nov. 21, 1933. G. PENN 1,936,207
LOCKING MEANS FOR FUEL TANKS OF AUTOMOBILES
Filed June 17, 1931 2 Sheets-Sheet 1
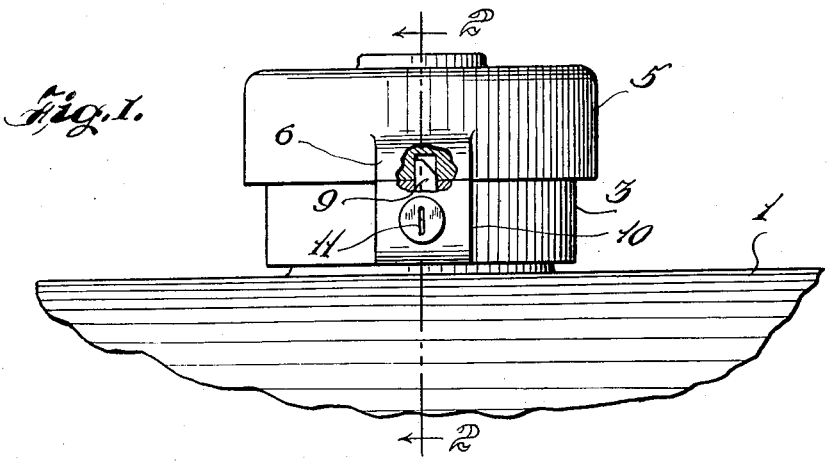
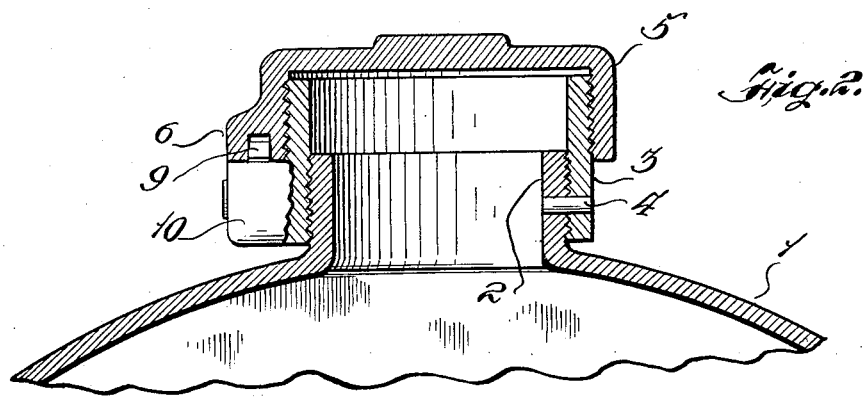
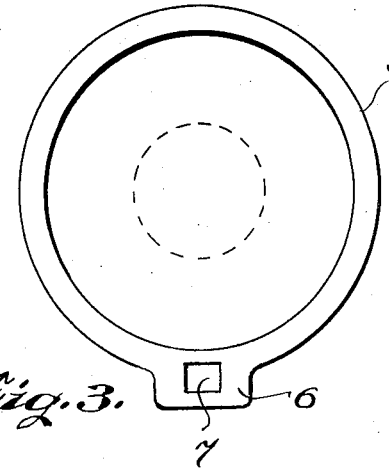
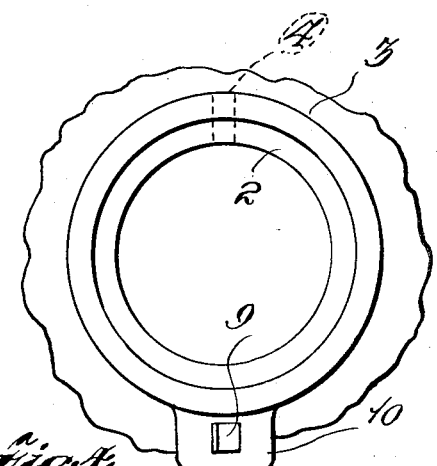
INVENTOR.
Gregory Penn,
BY John M. Spellman
ATTORNEY.

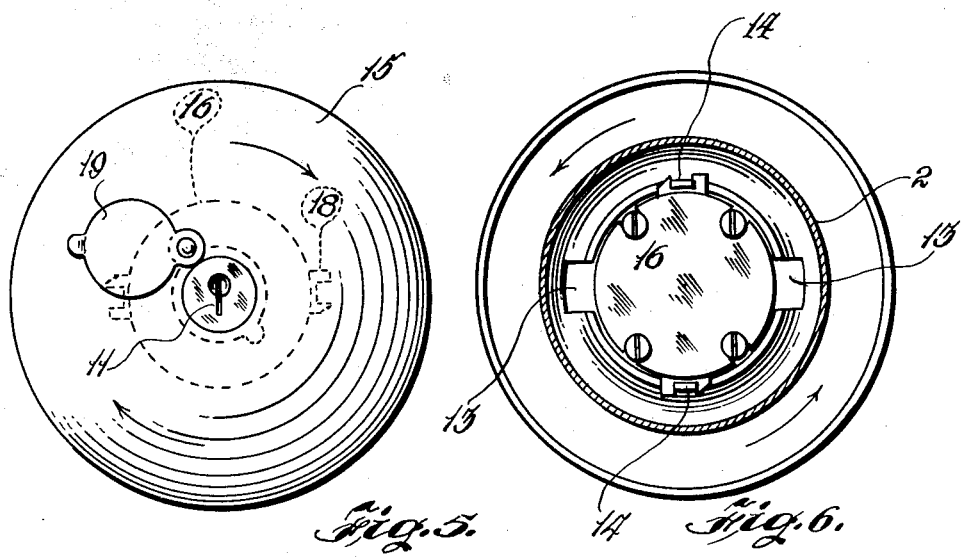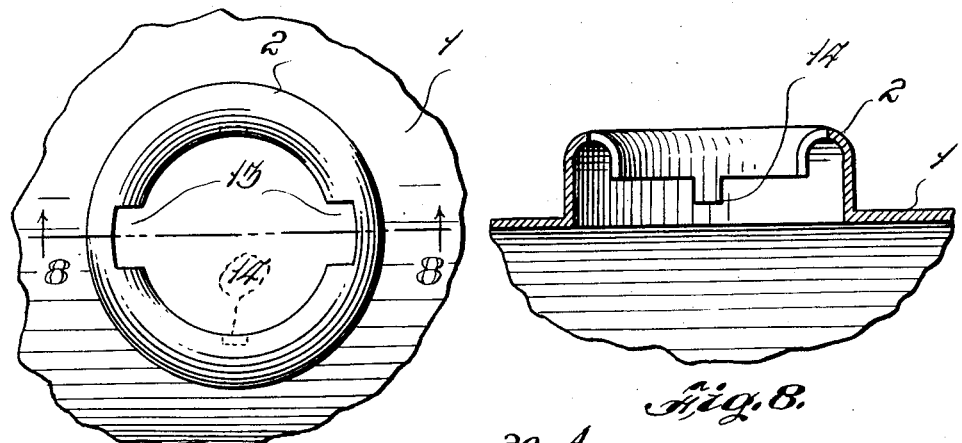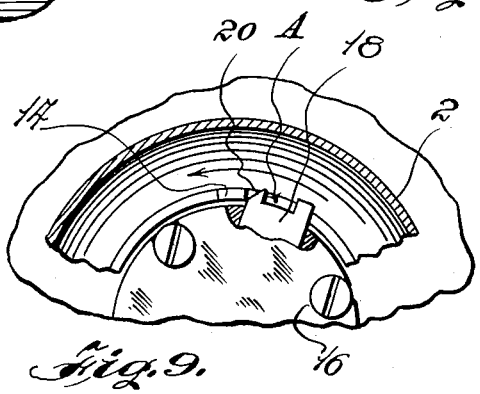

Patented Nov. 21, 1933

1,936,207

UNITED STATES PATENT OFFICE 1,936,207

LOCKING MEANS FOR FUEL TANKS OF AUTOMOBILES

Gregory Penn, Dallas, Tex.

Application June 17, 1931. Serial No. 545,061

2 Claims. (Cl. 220—55)

This invention relates to improvements in locking means for fuel tanks of automobiles and in such connection it has more pertinent reference to a cap which is capable of being locked in position on the tank.

More particularly the invention provides a cap which may be locked in threaded relation to the neck of the tank.

A further object of the invention in this respect is that the cap may be locked to the fuel tank neck at the top of the cap, or locked to the neck at the side thereof, and very easily and readily attached and removed from the tank neck.

In the drawings forming a part of this specification:

Figure 1 represents an elevational view of the cap connected in locked position to the neck of an automobile fuel tank.

Figure 2 is a sectional detail view on the line 2—2 of Figure 1.

Figures 3 and 4 are a bottom view of the cap removed from the tank neck and a top view of the tank neck, respectively.

Figure 5 is a top view of another form of the cap.

Figure 6 is a bottom view of the cap shown in Figure 5, showing the lock in the cap and a sectional view of the tank neck.

Figure 7 is a top plan view of an automobile tank neck, cap removed.

Figure 8 is a sectional view on line 8—8 of Figure 7, and Figure 9 is a detail sectional view of the bottom of the cap showing the locking lugs being advanced to locking position.

Referring more particularly to the drawings, 1 denotes fragmentarily the body of an automobile tank with neck 2. To the neck is threaded a collar 3, permanently fixed to the neck by a pin 4. The collar projects above the neck and has a threaded portion whereon is threadedly engaged a cap 5. Formed on the side of the cap is a protuberance 6 with a recess 7 for engagement with the locking member 9 of a lock 10 with a key way 11.

In the operation of this form of locking means the cap is placed on the collar 3 and rotated until the cap has been advanced downwardly to engage the recess 7 with the locking member 9.

In Figures 5 to 9 inclusive is shown another form of the locking means. In this form the tank neck is curved over and inwardly and includes spaced recesses 13 and a pair of lugs 14. The cap 15 has fixed thereto a lock 16 and includes lugs 18. A cover for the key way is shown at 19. In this form of locking means the cover or cap is placed on the neck and the cap rotated in the direction of arrows until the cap is moved around far enough to connect the lugs 14 with lugs 18. Figure 9 shows lug 18 about to be engaged with one lug 14, the beveled edge 20 on contact with lug 14 shoving the lugs 18 inwardly until past the lug 14, whereupon the lug 14 will be received in the recess A.

The invention is susceptible of modifications such as would be within the scope and meaning of the appended claims.

What is claimed is:

1. An automobile fuel tank locking means which comprises a cap forming a closure for the neck opening into the fuel tank, a lock carried in the top of the cap and including spaced locking members or lugs; said lugs having a substantially U shaped opening in the outer ends thereof, the neck of the tank being curved over and inwardly and downwardly and having spaced recesses for receiving the locking members or lugs of the lock; and spaced lugs formed on the inner edge of the neck, whereby the locking members or lugs will be moved inwardly of the lock when the cap is rotated in one direction and on contacting with the lugs of the neck, the neck lugs and locking members then becoming engaged one with the other.

2. In a device of the class described, in combination with an automobile fuel tank having a neck opening, a closure cap for said neck opening having locking means associated therewith, the said neck opening being curved over and inwardly and downwardly and having spaced recesses for receiving the locking means, spaced lugs formed on the inner edge of said neck, said locking means comprising spaced lugs having opening in the outer ends, and one corner of the outer ends of said lugs beveled off to present a substantially triangular member whereby the locking lugs will move inwardly to permit the openings in the outer ends of the locking members to receive the lugs on the inner edge of the said neck.

GREGORY PENN.